United States Patent [19]

Howe

[11] Patent Number: 5,306,446
[45] Date of Patent: Apr. 26, 1994

[54] APPARATUS WITH ROLLER AND FOR IRRADIATION OF PHOTOPOLYMERS

[76] Inventor: Robert J. Howe, W180 S6822 Muskego Dr., Muskego, Wis. 53150

[21] Appl. No.: 911,715

[22] Filed: Jul. 10, 1992

[51] Int. Cl.$^5$ ............................................. B29C 35/08
[52] U.S. Cl. ...................................... 264/22; 264/308; 430/322; 425/174.4
[58] Field of Search ............... 425/174.4; 264/22, 308; 430/322

[56] References Cited

U.S. PATENT DOCUMENTS

| | | | |
|---|---|---|---|
| 4,752,498 | 6/1988 | Fudim | 427/54.1 |
| 5,122,441 | 6/1992 | Lawton et al. | 425/174.4 |
| 5,143,817 | 9/1992 | Lawton et al. | 425/174.4 |
| 5,158,858 | 10/1992 | Lawton et al. | 425/174.4 |
| 5,171,490 | 12/1992 | Fudim | 425/174.4 |
| 5,175,077 | 12/1992 | Grossa | 425/174.4 |

Primary Examiner—Morton Foelak
Assistant Examiner—Rachel Johnson
Attorney, Agent, or Firm—Michael Best & Friedrich

[57] ABSTRACT

An apparatus for producing three dimensional objects by irradiating uncured photopolymeric material to solidify at least portions of the photopolymeric material, the apparatus being adapted to be used with film material which does not substantially interfere with transmission of radiation therethrough, the apparatus comprising: a tank adapted to contain liquid photopolymeric material, the liquid photopolymeric material in the tank defining an upper generally horizontal surface; a selectively operable source of radiation for solidifying the liquid photopolymeric material in the tank; and structure for smoothing the upper generally horizontal surface of the liquid photopolymeric material in the tank while moving from a first position on one side of the tank to a second position on another side of the tank, and for simultaneously laying a sheet of the film material onto the liquid photopolymeric material while moving from the first position to the second position.

17 Claims, 7 Drawing Sheets

APPARATUS WITH ROLLER AND FOR IRRADIATION OF PHOTOPOLYMERS

BACKGROUND OF THE INVENTION

The invention relates generally to apparatus for photopolymerization. More particularly, the invention relates to apparatus for producing three dimensional objects by irradiating uncured photopolymeric material to solidify the photopolymeric material.

It is known to create three dimensional objects by building up layers of photopolymeric material. See, for example, "Rapid Prototyping Systems," *Mechanical Engineering*, April 1991, pp. 34–43, incorporated herein by reference. See also, for example, U.S. Pat. No. 4,752,498, issued to Fudim on Jun. 21, 1988 and incorporated herein by reference. That patent also discloses that, when creating three dimensional objects by building up layers of photopolymeric material, it is advantageous to employ, in contact with the photopolymeric material, a transparent member which does not substantially interfere with subsequent linking of photopolymeric material from one layer to another layer, and which transparent member can be removed after an irradiation of a layer. To increase the size of the three dimensional object being created, after irradiation of a first layer, the transparent member is removed from the first layer, more photopolymeric material is added on top of the first layer, the transparent member is placed on top of and in contact with the newly added photopolymeric material, and the photopolymeric material is irradiated from above the transparent member. The transparent member is disclosed as being a glass plate 13 with a coating 23 thereunder, or such as a stretched transparent film of the material of the coating 23. The coating 23 is of a material which leaves the irradiated upper surface of photopolymeric material capable of further cross-linking. The disclosed preferred material for the coating 23 is fluorinated ethylene propylene copolymer.

SUMMARY OF THE INVENTION

The invention provides a method of and apparatus for placing a stretched transparent film in contact with liquid photopolymeric material, in preparation for irradiation to cure of solidify the photopolymeric material in the manner described in U.S. Pat. No. 4,752,498 which is incorporated herein by reference.

One aspect of the invention provides an apparatus for producing three dimensional objects by irradiating uncured photopolymeric material to solidify at least portions of the photopolymeric material, the apparatus comprising: a tank adapted to contain liquid photopolymeric material, the liquid photopolymeric material in the tank defining an upper generally horizontal surface; a selectively operable source of radiation; and means for smoothing the upper generally horizontal surface of photopolymeric material in the tank while moving from a first position on one side of the tank to a second position on another side of the tank, and for simultaneously laying a sheet of flexible film material which does not substantially interfere with transmission of the radiation therethrough onto the liquid polymer while moving from the first position to the second position. Use of the film results in a level layer of liquid photopolymeric material in the tank, and prevents liquid photopolymeric material from becoming attached to components of the apparatus that are above the tank. The film does not substantially interfere with cross linking of one level of photopolymeric material with another level of photopolymeric material. Thus, the apparatus can be used with the film to create three dimensional objects if the film is removed from an irradiated first layer of photopolymeric material, more liquid photopolymeric material is added on top of the first layer, the film is laid on top of the liquid and hardened photopolymeric material, and the source of radiation is again operated.

Another aspect of the invention provides an apparatus for producing three dimensional objects by irradiating uncured photopolymeric material to solidify at least portions of the photopolymeric material, the apparatus comprising: a tank adapted to contain liquid photopolymeric material, the liquid photopolymeric material in the tank defining an upper generally horizontal surface; selectively operable means for irradiating photopolymeric material in the tank; and means, including a roller, movable between a first position on one side of the tank to a second position on the other side of the tank for laying a sheet of film onto the liquid polymer while moving from the first position to the second position and with the roller adapted to contact a surface of the film which surface faces away from the liquid polymer and to press the film against the liquid polymer.

Another aspect of the invention provides a method of producing three dimensional objects by irradiating uncured photopolymeric material to solidify at least portions of the photopolymeric material, the method comprising the following steps: providing an apparatus which includes a tank adapted to contain liquid photopolymeric material, includes a roller means for smoothing a sheet of film onto the liquid polymer, and includes a selectively operable source of radiation; providing liquid photopolymeric material in the tank, the liquid photopolymeric material defining an upper generally horizontal surface; causing the roller assembly means to smooth the film onto the upper generally horizontal surface of photopolymeric material while moving from a first position to a second position; and causing the selectively operable source of radiation to operate to supply radiation, through at least a portion of the film, to a least a portion of the liquid photopolymeric material in the tank.

Other features and advantages of the invention will become apparent to those of ordinary skill in the art upon review of the following detailed description, claims, and drawings.

DETAILED DESCRIPTION OF THE PREFERRED EMBODIMENT OF THE INVENTION

Figure 1:
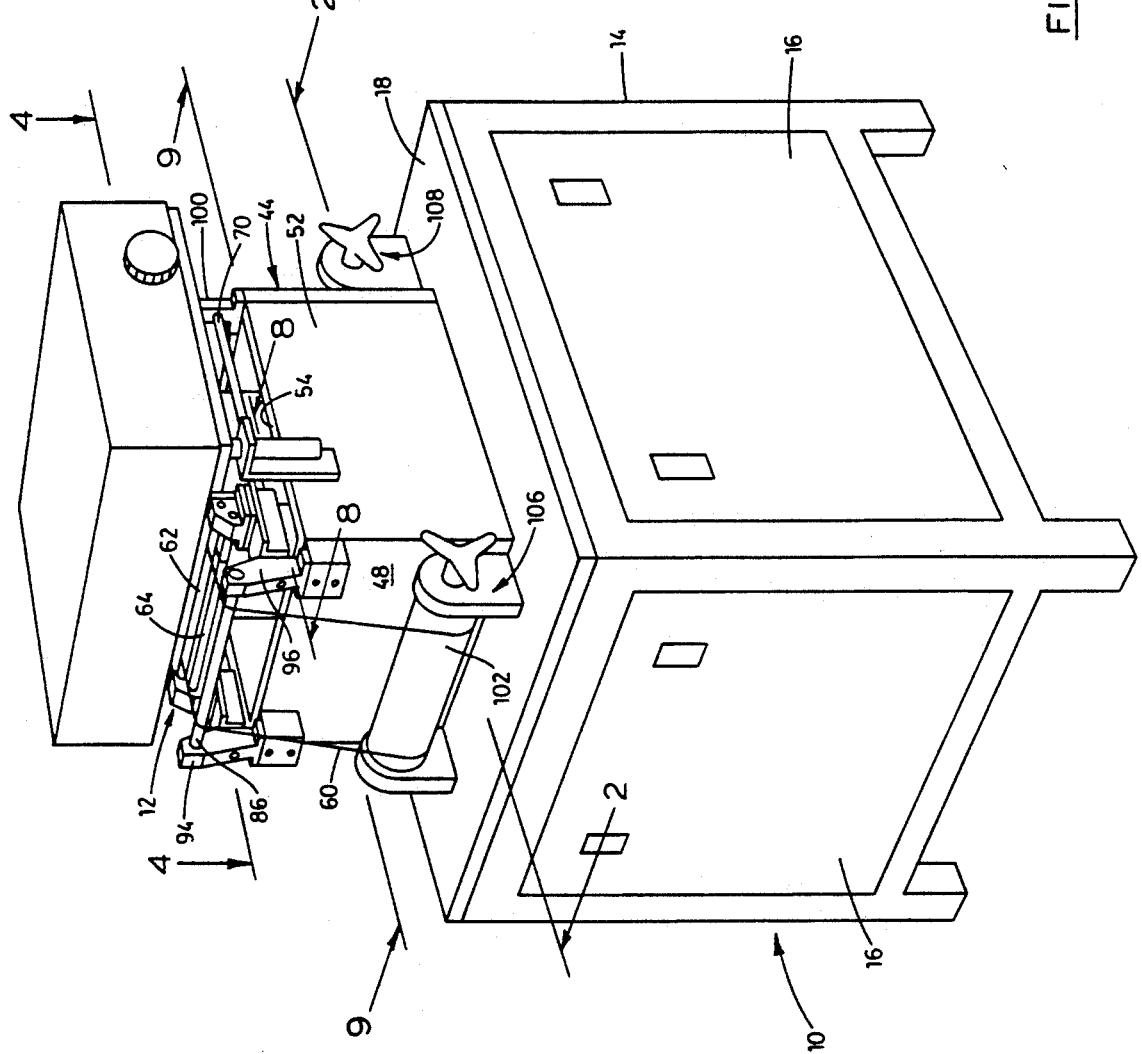
FIG. 1 is perspective view of an apparatus embodying various features of the invention and showing a cover assembly in a lower position, and showing a roller assembly in a forward position.

Shown in the various figures is an apparatus 10, including a roller assembly 12, which apparatus 10 is useful for producing three dimensional objects by irradiating uncured photopolymeric materials of the type described in U.S. Pat. No. 4,752,498 to cure or solidify the photopolymeric material.

The apparatus 10 includes a cabinet 14 having doors 16 which can be opened for access to various components of the apparatus 10, and having a top surface 18. The apparatus 10 includes a tank 20 for containing an uncured liquid photopolymeric material 22. The tank 20 has four vertical walls supported by the cabinet 14: a rear wall 24, a front wall 26, and side walls 28, and 30, respectively, arranged in the shape of an upwardly open box and extending up from the cabinet 14. The four walls 24, 26, 28, and 30 have coplanar upper ends defining a horizontal surface 32 above the top 18 of the cabinet 14. When liquid photopolymeric material 22 is added to the tank 20 to fill the tank 20, the liquid photopolymeric material 22 defines an upper horizontal surface coplanar with the horizontal surface 32. A slot 24A is defined in the rear wall 24, along the width and height of the rear wall 24. The apparatus 10 further includes, inside the cabinet 14, a container 34 for containing at least some of the liquid photopolymeric material 22, and a pump 36 in fluid communication with the container 34 for selectively pumping some of the liquid photopolymeric material 22 from the container 34 up through the slot 24A for a reason that will be described below.

In this description, height refers to distance in the vertical direction, width refers to distance in a direction parallel to the direction from the wall 28 to the wall 30, and length refers to distance in a direction parallel to the direction from the wall 24 to the wall 26.

The tank 20 further includes a bottom platform 38 vertically movable in the tank 20 and capable of being selectively fixed in any of several possible vertical positions. The bottom platform 38 has a glass top horizontal surface. The bottom platform 38 is supported in a horizontal orientation in each of the several possible vertical positions thereof and has respective edges in close contact with the four vertical walls 24, 26, 28, and 30 of the tank 20. The apparatus 10 further includes, in the cabinet 14, a motor 40 and a motor control 42 which together vertically move the platform 38 in the tank 20 and cause the platform 38 to be selectively fixed in any of the several possible vertical positions.

The apparatus 10 further includes an outer tank 44 for receiving liquid 22 that spills over from the tank 20. The outer tank 44 has four vertical walls 46, 48, 50, and 52, respectively, arranged in the shape of an upwardly open box surrounding or containing the tank 20 and extending up from the cabinet 14. The four walls 46, 48, 50, and 52 have coplanar upper ends defining a horizontal surface 54 that is lower than the horizontal surface 32 and that is above the top 18 of the cabinet 14.

The apparatus 10 optionally includes drainage holes 53A and 53B at the bottoms of tanks 20 and 44, respectively, and a selectively operable drainage pump 55 for draining excess liquid from the bottom of tanks 20 and 44 into the container 34 or to some other receptacle.

Figure 2:
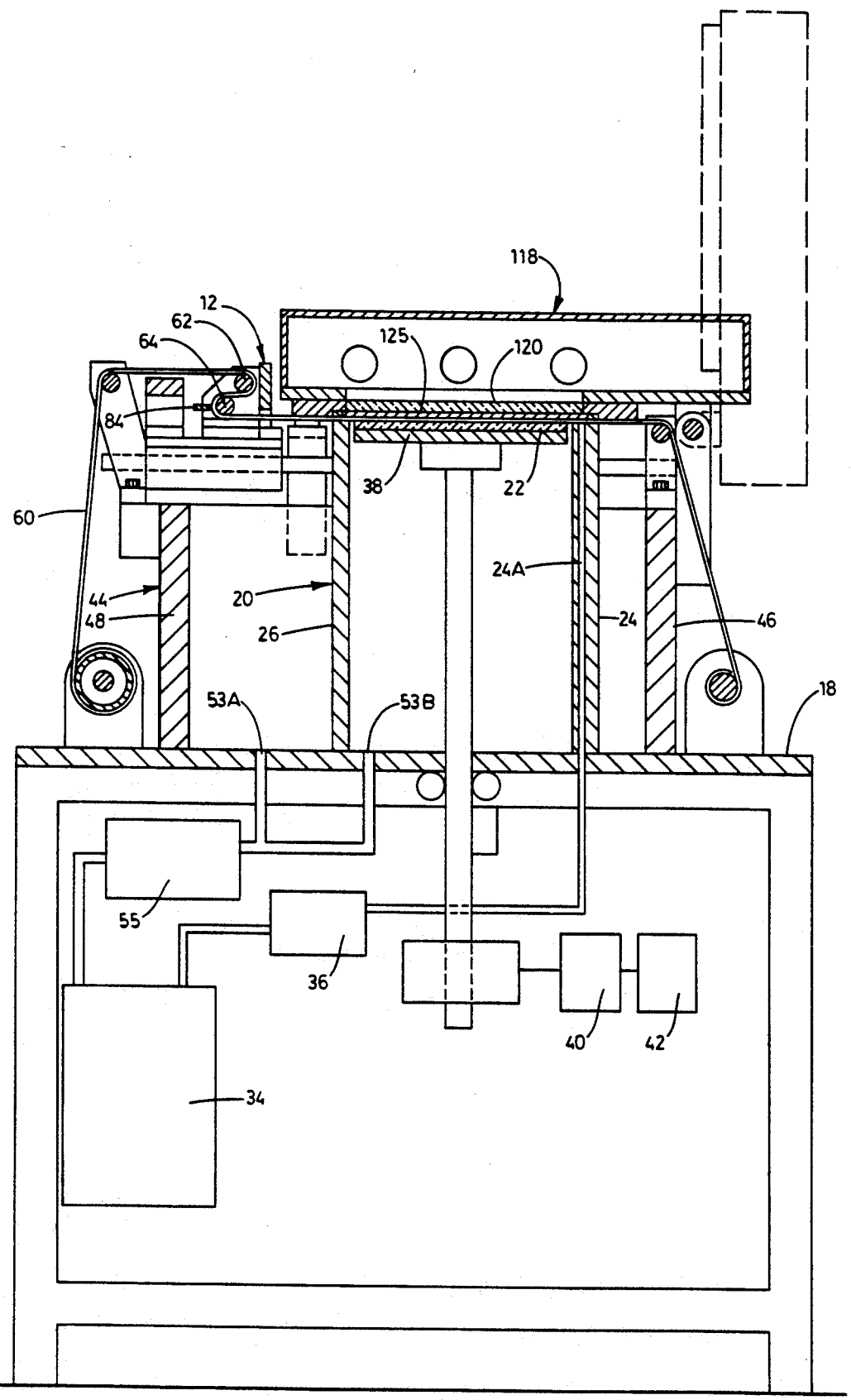
FIG. 2 is a sectional view taken along line 2—2 in FIG. 1.
Figure 3:
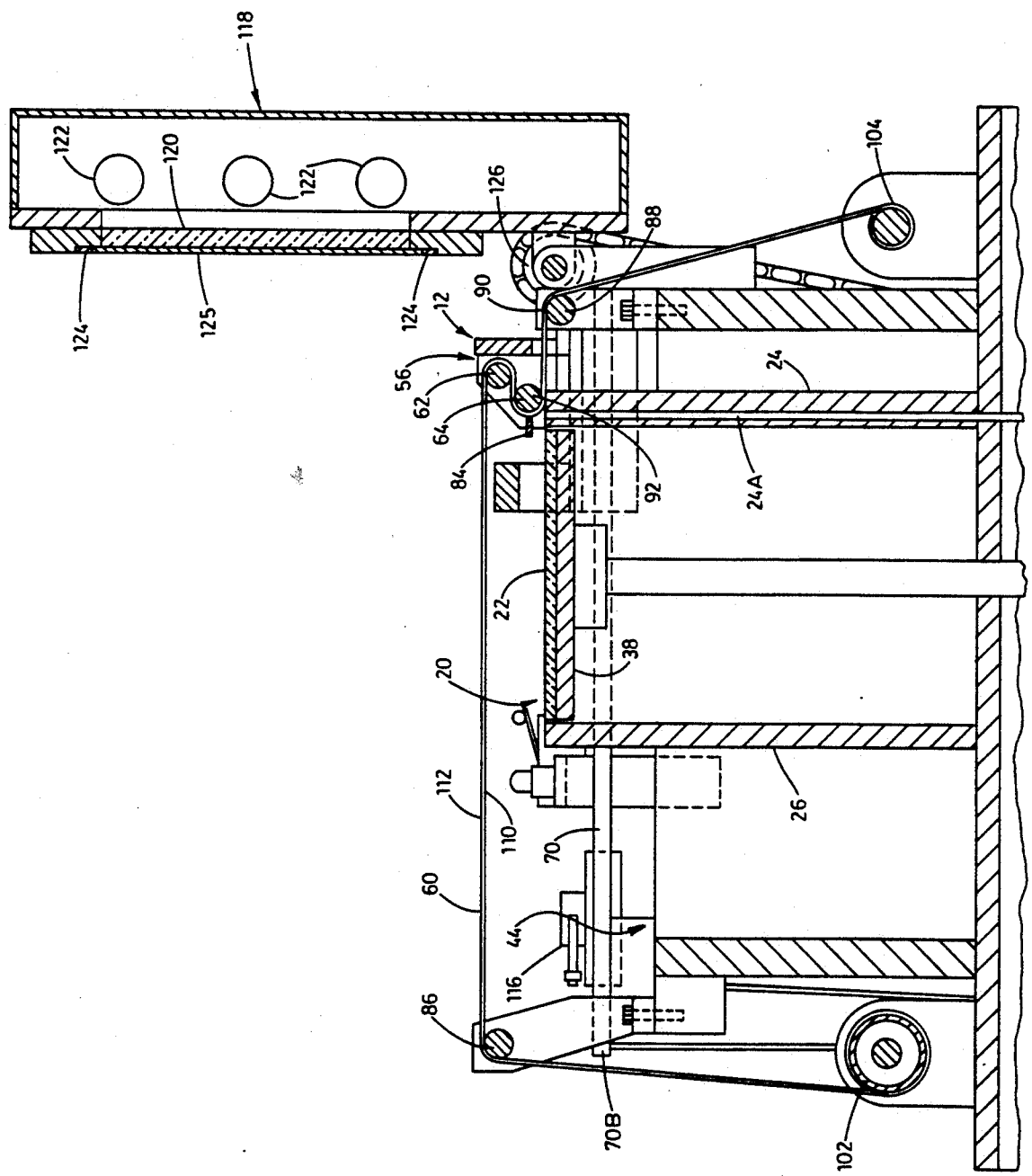
FIG. 3 corresponds to FIG. 2 with a portion of the apparatus partially broken away, with the cover assembly in a raised position, and with the roller assembly in a rearward position.
Figure 4:
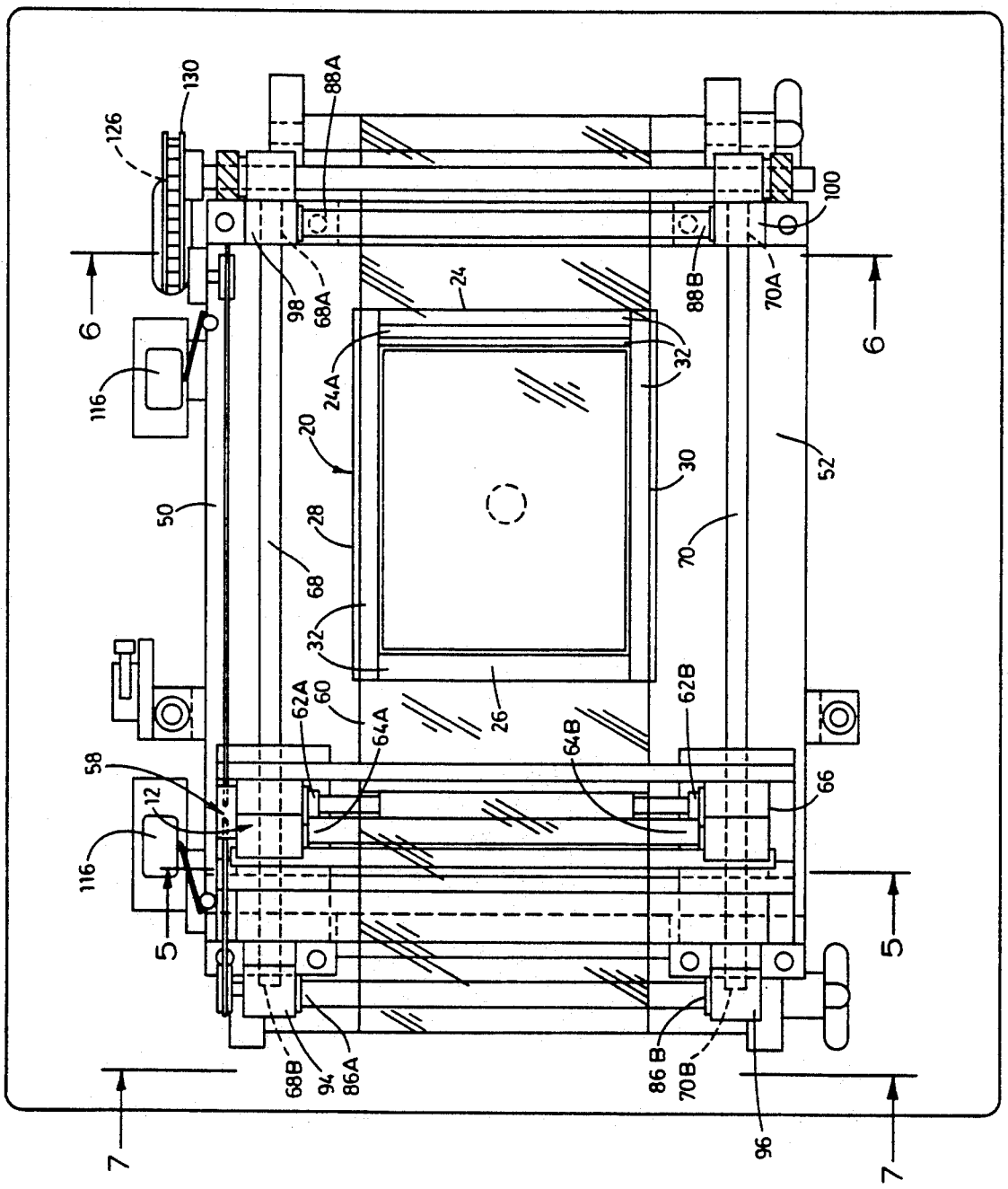
FIG. 4 is a sectional view taken along line 4—4 in FIG. 1.

The apparatus 10 further includes means for smoothing the upper generally horizontal surface of the liquid photopolymeric material 22 in the tank 20 while moving from a first position 56 (see FIG. 3) on one side of the tank 20 to a second position 58 (see FIG. 4) on another side of the tank 20, and for simultaneously laying a sheet of film 60 onto the liquid polymer 22 while moving from the first position 56 to the second position 58. In the illustrated embodiment, this means comprises the roller assembly 12. The roller assembly 12 (FIG. 2) comprises upper and lower parallel spaced apart film guide rods 62 and 64, respectively, each extending horizontally in respective directions that are each perpendicular to the direction of movement of the roller assembly 12 between the first position 56 and the second position 58. The upper guide rod 62 has opposite ends 62A and 62B (FIG. 4), respectively, and the lower guide rod 64 has opposite ends 64A and 64B (FIG. 4), respectively. The upper guide rod 62 is located above the lower guide rod 64. In the illustrated embodiment, the distance between the upper guide rod 62 and the lower guide rod 64 is fixed. When the roller assembly 12 is in the first position 56, the upper guide rod 62 is located further from the tank 20 than the lower guide rod 64.

The roller assembly 12 further includes a frame 66 (see FIG. 4) supporting the upper and lower guide rods 62 and 64, respectively, by the opposite ends 62A, 62B, 64A, and 64B of the upper and lower guide rods 62 and 64. In the illustrated embodiment, the upper guide rods 62 is a roller capable of rolling relative to the frame 66 about an axis defined along the direction between the opposite ends 62A and 62B of the guide rod 62. Also in the illustrated embodiment, the lower guide rod 64 is a roller capable of rolling relative to the frame 66 about an axis defined along the direction between the opposite ends 64A and 64B of the guide rod 64.

The apparatus 10 further comprises (see FIG. 4) first and second parallel, horizontal, spaced apart tracks 68 and 70, respectively, on opposite sides of the tank 20. The track 68 has opposite ends 68A and 68B, and the track 70 has opposite ends 70A and 70B. The frame 66 of the roller assembly 12 is mounted on the tracks 68 and 70 and is guided by the tracks 68 and 70 between the first position 56 and the second position 58. The tracks 68 and 70 support the roller assembly 12 such that the lower guide rod 64 is closely spaced from the upper horizontal surface 32, as the lower guide rod 64 passes over the tank 20 during travel of the roller assembly 12 between the first position 56 on one side of the tank 20 to the second position 58, so that lower guide rod 64 contacts the film 60 and places the film 60 in intimate contact with the upper horizontal surface of the liquid photopolymeric material 22 when the roller assembly 12 moves between the first position 56 and the second position 58.

Figure 5:
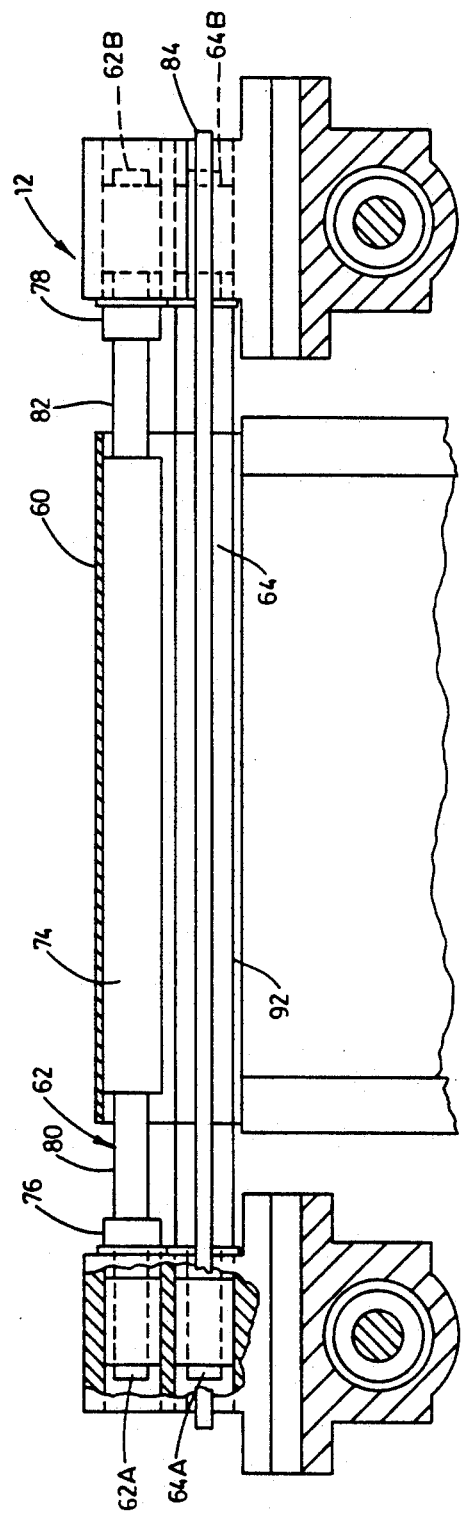
FIG. 5 is a sectional view taken along line 5—5 in FIG. 4.
Figure 6:
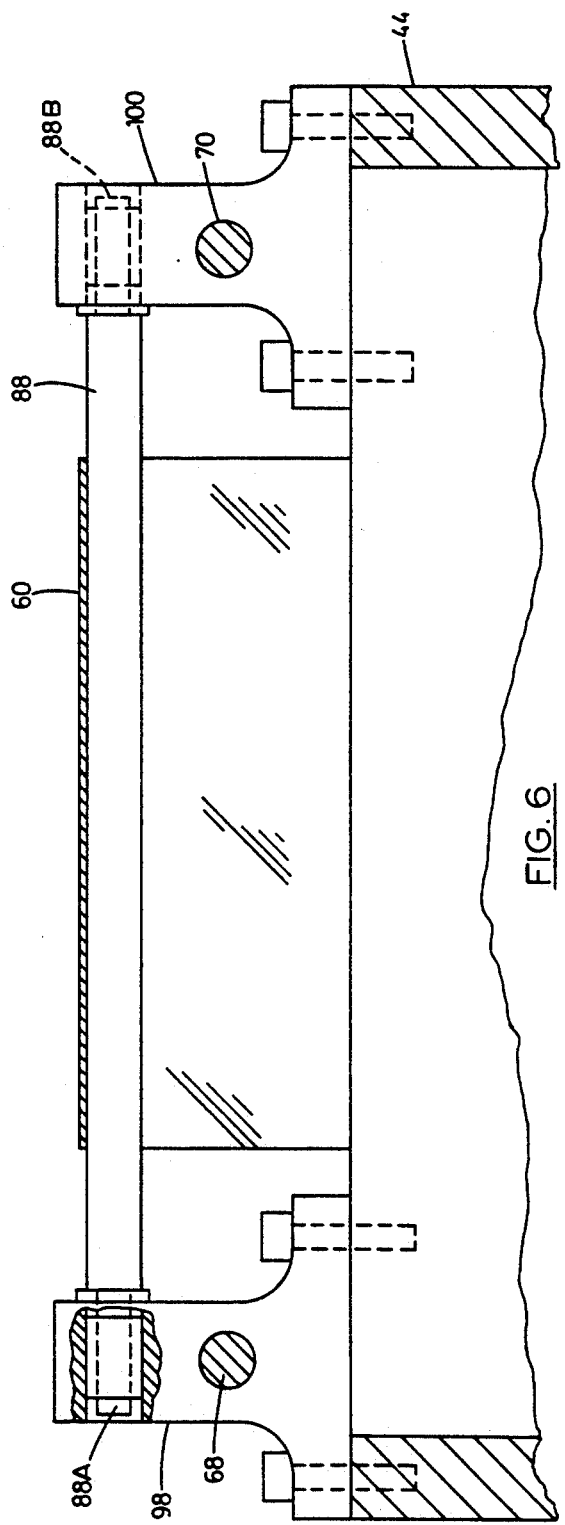
FIG. 6 is a sectional view taken along line 6—6 in FIG. 4.
Figure 7:
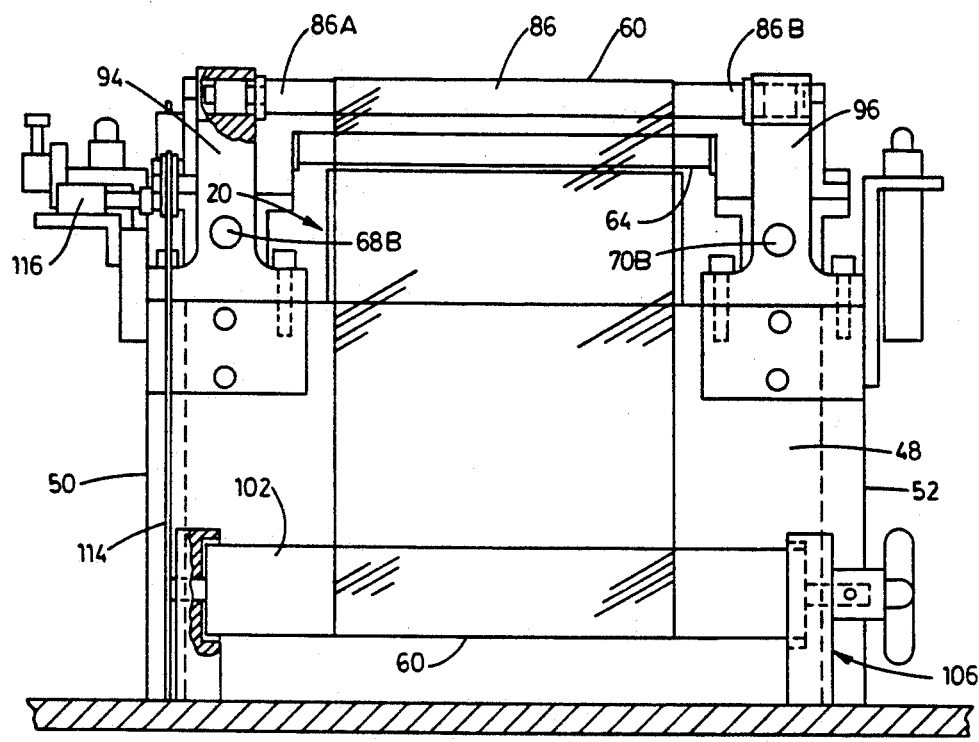
FIG. 7 is a sectional view taken along line 7—7 in FIG. 4.
Figure 8:
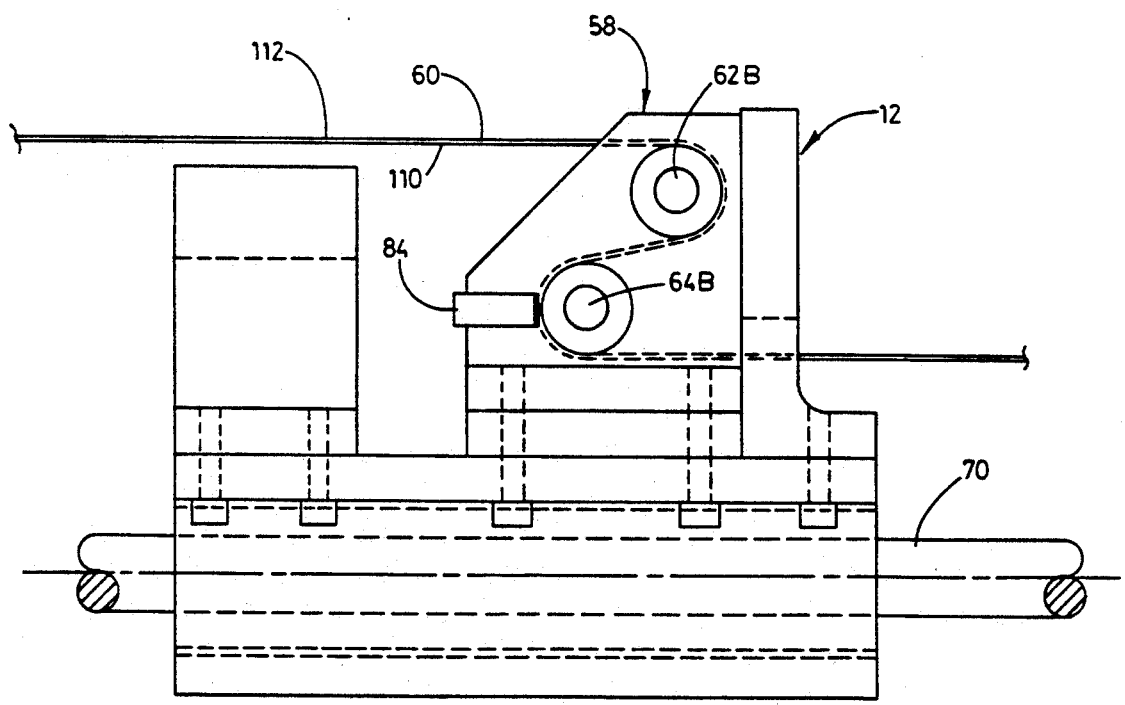
FIG. 8 is a sectional view taken along line 8—8 in FIG. 1.

Although the upper guide rod 62 could have a diameter that is uniform between the ends 62A and 62B of the upper guide rod 62, the upper guide rod 62, in the illustrated embodiment, has a middle cylindrical portion 74 (FIG. 5) having a circumference. The upper guide rod 62 has a cylindrical end portion 76 extending from the end 62A, and has a cylindrical end portion 78 extending from the end 62B. The upper guide rod 62 has reduced circumference portions 80 and 82, respectively, between the middle portion 74 and the end portions 76 and 78, on either side of the middle portion 74. The reduced circumference portions 80 and 82 each have a circumference less than the circumference of the middle cylindrical portion 74, and of the cylindrical end portions 76 and 78. The middle cylindrical portion 74 has a width that is at least as wide as the width of the tank 20 and entire width of the middle cylindrical portion 74 passes over the tank 20 as the roller assembly 12 moves from the first position 56 to the second position 58. This configuration of the upper guide rod 62 assists in keeping liquid from the tank 20 away from the middle portion 74 of the upper guide rod 62.

To further assist in keeping liquid from the tank 20 away from the middle portion 74 of the upper guide rod 62, the roller assembly 12 further includes a wiper bar 84 (FIGS. 3 and 5) fixed to the frame 72 so as to be closely spaced from the lower guide rod 64. The wiper bar 84 is sufficiently close to the lower guide rod so as to substantially prevent liquid on the film 60 from reaching the upper guide rod 62. In the illustrated embodiment, the wiper bar 84 is spaced 0.002 of an inch from the lower guide rod 64.

The apparatus 10 further comprises a third guide rod 86, parallel to the upper and lower guide rods 62 and 64, located a fixed distance from the tank 20, located higher than the lower guide rod 64, and located such that the upper and lower guide rods 62 and 64 are between (in top view) the tank 20 and the third guide rod 86 when the roller assembly 12 is in the second position 58. The third guide rod 86 has opposite ends 86A and 86B.

The apparatus 10 further comprises a fourth guide rod 88, parallel to the upper and lower guide rods 62 and 64, located a fixed distance from the tank 20, located below the lower guide rod 64 such that an uppermost surface 90 (FIG. 3) on the fourth guide rod 88 is at the same height (in side view) as a lowermost surface 92 on the lower guide rod 64, and located such that the upper and lower guide rods 62 and 64 (FIG. 4) are between (in top view) the tank 20 and the fourth guide rod 88 when the roller assembly 12 is in the first position 56. The uppermost surface 90 may be below the lowermost surface 92 by a vertical distance corresponding to the thickness of the film 60 anticipated to be used with the apparatus 10. The fourth guide rod 88 has opposite ends 88A and 88B.

The apparatus 10 further includes four unitary corner pieces 94, 96, 98, and 100 that are each fixed against movement relative to the tank 20. Each corner piece 94, 96, 98, and 100 supports both an end 68A, 68B, 70A, or 70B of one of the first and second tracks 68 and 70, and an end 86A, 86B, 88A, or 88B of one of the third and fourth guide rods 86 and 88. In the illustrated embodiment, each corner piece 94, 96, 98, and 100 is fixed to the outer tank 44 proximate to a corner defined by two vertical walls of the outer tank 44. In the illustrated embodiment, the third guide rod 86 is a roller supported by the corner pieces 94 and 96 for rotation relative to the corner pieces 94 and 96 about an axis extending along the direction between the opposite ends 86A and 86B. Also, in the illustrated embodiment, the fourth guide rod 88 is a roller supported by the corner pieces 98 and 100 for rotation relative to the corner pieces 98 and 100 about an axis extending along the direction between the opposite ends 88A and 88B.

The apparatus 10 further includes means for providing tension to the film 60 while the roller assembly 12 is in the first position 56, the second position, 58 and while the roller assembly 12 moves between the first position 56 and the second position 58. In the illustrated embodiment, the tension providing means comprises first spooling means (FIG. 3) adapted for supporting a first spooled portion 102 of the film 60 below the third guide rod 86 and in an orientation parallel to the third guide rod 86, and second spooling means adapted to support a second spooled portion 104 of the film 60 below the fourth guide rod 88 and in an orientation parallel to the fourth guide rod 88. In the illustrated embodiment, the first spooling means comprises a supply spool holder 106 (FIG. 1) mounted on the top 18 of the cabinet 14, and the second spooling means comprises a take-up spool holder 108 mounted on the top 18 of the cabinet 14. The supply spool holder 106 is spring biased to rotate the first spooled portion 102 in one direction of rotation, and the take-up spool holder 108 is capable of rotating in only one direction. Therefore, the second spooled portion 104 is capable of rotating with the take-up spool holder 108 in only one direction of rotation so that movement of film 60 in the second spooled portion toward the first spooled portion is prevented. This provides tension to the film 60 in the direction of travel of the roller assembly 12 between the first and second positions 56 and 58. The lower, third and fourth guide rods 64, 86, and 88, and the middle portion 74 each have widths wider than the width of the tank 20, and are all positioned, along the direction of the width of the tank 20, to extend on either side of the tank 20 (on either side of the walls 28 and 30 of the tank 20).

The film 60 used in the apparatus 10 has opposite major surfaces 110 and 112. The film 60 is wound around the upper, lower, third, and fourth guide rods 62, 64, 86, and 88, and between the supply spool holder 106 and the take-up spool holder 108 in the manner shown in FIG. 3 such that the lower guide rod 64 contacts the surface 112 of the film 60, and the third, fourth and upper guide rods contact the surface 110 of the film 60. As described below, the apparatus 10 can be used to create three dimensional objects by building up layers of hardened photopolymeric material. The film 60 is a material which does not substantially interfere with transmission of radiation therethrough, and does not interfere with linking of photopolymeric material from one layer to another layer. The film 60 is of a material which is substantially inert with respect to radiation and with respect to the photopolymeric material, in both the liquid and cured or hardened form, and which film has non-sticking surface properties permitting the film to be easily stripped from an irradiated layer. In the illustrated embodiment, the transparent film 60 is a film of fluorinated ethylene propylene copolymer.

Figure 9:
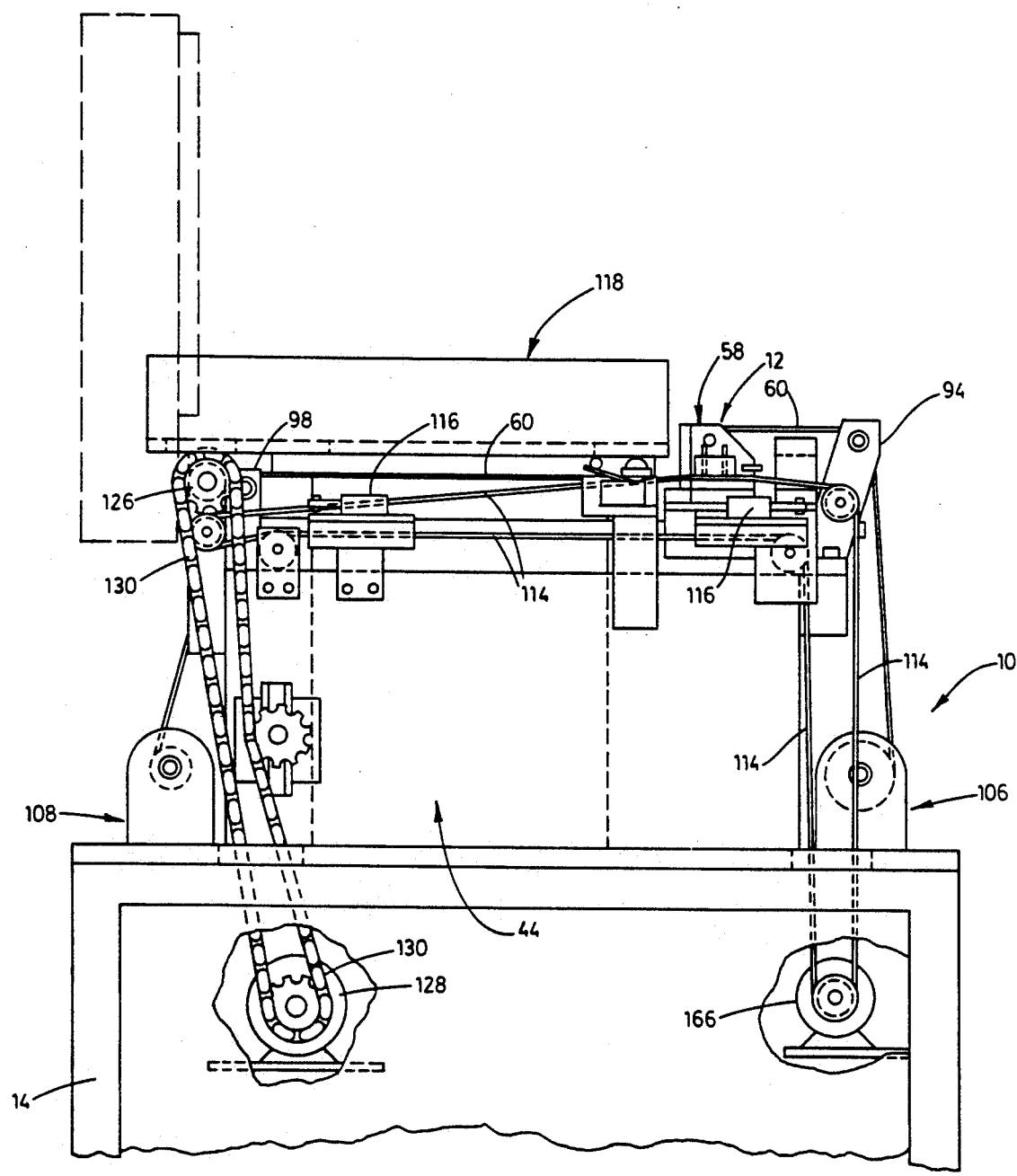
FIG. 9 is a side elevational view.

The apparatus 10 further comprises selectively operable means, including a drive motor 166 (see FIG. 9), for moving the roller assembly 12 between the first and second positions 56 and 58. The apparatus 10 further includes a cable 114 attached to the roller assembly 12 and selectively driven by the drive motor 166. The drive motor 166 is activated by an operator to move the roller assembly 12 from the first position 56 to the second position 58 before an irradiation operation. The apparatus 10 further includes travel limit switches 116 (see FIG. 9) positioned to be contacted by the roller assembly 12, and for turning off the drive motor 166 when the roller assembly 12 reaches the first position from the second position 58 or when the roller assembly 12 reaches the second position 58 from the first position 56.

The apparatus 10 includes selectively operable means for irradiating photopolymeric material in the tank 20. In the illustrated embodiment, the selectively operable means comprises a cover assembly 118 which, in the illustrated embodiment, is hingedly supported by the outer tank 44 at a location rearward of the guide rod 88 for pivotal movement about an axis parallel to the axis of the guide rod 88 between raised and lowered positions. The cover assembly 118 includes a glass plate 120 that is adapted to be horizontally oriented and closely spaced above film 60 that has been placed by the roller assembly 12 into contact with liquid photopolymeric material in the tank 20 when the cover assembly 118 is in the lowered position. The cover assembly 118 includes light tubes 122 which, when the cover assembly 118 is in the lowered position, are above the glass plate 120, and the cover assembly 118 further includes a shutter mechanism (not shown) for energizing and deenergizing the light tubes 122. The cover assembly 118 further includes clips 124 for attaching a mask 125 against the glass plate 120 such that the mask 125 is generally horizontally oriented between the glass plate 120 and the film 60 that has been placed by the roller assembly 12 into contact with liquid photopolymeric material in the tank 20 when the cover assembly 118 is in the lowered position. The mask 125 has thereon a pattern that is a negative of the pattern that is desired to be formed in the photopolymeric material in the tank 20. The apparatus 10 further includes a sprocket 126 at the location where the cover assembly 118 is pivotally connected to the outer tank 44 and which sprocket 126 rotates with pivoting of the cover assembly 118. In the illustrated embodiment of the invention, the apparatus 10 further includes a selectively operable cover assembly drive motor 128 mounted to the cabinet 14 inside the cabinet 14, and a chain 130 connecting the motor 128 to the sprocket 126. The motor 128, the chain 130 and the sprocket 126 are used to selectively pivot the cover assembly 118 between the raised position and the lowered position.

In use of the apparatus 10, to create a layer of hardened photopolymeric material having a pattern defined by a mask attached to the glass plate 120, the following steps are performed. Starting with the cover assembly 118 in the raised position, with the roller assembly 12 in the first position 56, with the film 60 wound, from the supply spool holder to the take-up spool holder around the fourth, upper, lower, and third guide rods in the manner described above and shown in FIG. 3, and with the tank 20 filled with liquid photopolymeric material, a small amount of additional liquid photopolymeric material is caused to be pumped up through the slot 24A. Immediately thereafter, the drive motor 66 is activated to move the roller assembly 12 from the first position 56 to the second position 58 shown in FIG. 4. Laying the film 60 onto liquid photopolymeric material with the roller assembly 12 results in a smoothed, level, upper layer of liquid photopolymeric material in the tank, results in precise depth control of photopolymeric material, and results in prevention of attachment of liquid photopolymeric material to components of the apparatus that are above the tank. The cover assembly 118, with an appropriate mask attached thereto, is then pivoted to the lowered position shown in FIG. 1. The shutter mechanism is then actuated so that the photopolymeric material in the tank 20 is irradiated for a predetermined amount of time by the light tubes 122 (via the glass plate, the mask, and the film). The cover assembly 118 is then pivoted to the raised position. The drive motor 66 is then activated to move the roller assembly 12 from the second position 56 to the first position 58 so as to separate the film 60 from the irradiated photopolymeric material in the tank 20 (see FIG. 3).

The apparatus 10 can be used to create three dimensional objects by building up layers (each approximately 0.001–0.005 of an inch thick) of hardened photopolymeric material. To increase the size of the three dimensional object being created, after irradiation of a first layer, and after the film 60 is removed from the first layer, the platform 38 is lowered, more liquid photopolymeric material is added on top of the first layer, the roller assembly 12 is actuated to place the film 60 on top of and in contact with the newly added photopolymeric material, and the photopolymeric material is irradiated from above the film 60 and through an appropriate mask (which may be the same mask as was last used, or a different mask).

Ordinarily, film 60 does not need to be advanced from the supply spool to the take-up spool for successive irradiation operations. However, if a portion of the film 60 above the tank 20 is somehow damaged, when separated from a cured previously irradiated layer of photopolymeric material for example, film 60 can be advanced from the supply spool to the take-up spool so that a new portion of film 60 is located above the tank for a successive irradiation operation.

While a preferred embodiment of the invention has been described, various modifications are possible. Thus, the scope of the invention is to be limited only by the scope and spirit of the following claims.

I claim:

1. An apparatus for producing three dimensional objects by irradiating uncured photopolymeric material to solidify at least portions of the photopolymeric material, said apparatus being adapted to be used with film material which does not substantially interfere with transmission of radiation therethrough, said apparatus comprising:

a tank adapted to contain liquid photopolymeric material, the liquid photopolymeric material in said tank defining an upper generally horizontal surface;

a selectively operable source of radiation for solidifying the liquid photopolymeric material in said tank; and means for smoothing the upper generally horizontal surface of the liquid photopolymeric material in said tank while moving from a first position on one side of said tank to a second position on another side of said tank, and for simultaneously laying a sheet of film onto the liquid photopolymeric material while moving from the first position to the second position, said smoothing and laying means including upper and lower parallel spaced apart film guide rods each extending horizontally in respective directions that are each perpendicular to the direction of movement of said smoothing and laying means between the first position and the second position, wherein said upper guide rod is located above the lower guide rod and, when said smoothing and laying means is in said first position, said upper guide rod being located further from said tank than said lower guide rod.

2. An apparatus in accordance with claim 1 wherein said upper guide rod is spaced from said lower guide rod by a fixed distance.

3. An apparatus in accordance with claim 1 and further comprising first and second parallel, horizontal, spaced apart tracks on opposite sides of said tank, said smoothing and laying means being mounted on said tracks and being guided by said tracks between the first position and the second position.

4. An apparatus in accordance with claim 3 wherein said lower guide rod comprises a roller adapted to contact the film and to place the film into intimate contact with the upper horizontal surface of liquid when said smoothing and laying means moves between the first and second positions.

5. An apparatus in accordance with claim 3 and further comprising a third guide rod, parallel to said upper and lower guide rods, located a fixed distance from said tank, located higher than said lower guide rod, and located such that said upper and lower guide rods are between said tank and said third guide rod when said smoothing means is in said second position, said apparatus further comprising a fourth guide rod, parallel to said upper and lower guide rods, located a fixed distance from said tank, located lower than said lower guide rod such that an uppermost surface on said fourth guide rod is at the same height as a lowermost surface on said lower guide rod, and located such that said upper and lower guide rods are between said tank and said fourth guide rod when said smoothing and laying means is in said first position.

6. An apparatus in accordance with claim 5 wherein said first track has first and second ends, wherein said third guide rod has first and second ends, and wherein said apparatus further includes a unitary corner piece, fixed against movement relative to said tank, said corner piece supporting both said first end of said first track and said first end of said third guide rod.

7. An apparatus in accordance with claim 5 and further comprising means for providing tension to the film while said smoothing and laying means is in the first position and the second position.

8. An apparatus in accordance with claim 7 wherein the tension providing means comprises first spooling means adapted to support a first spooled portion of the film below said third guide rod and in an orientation parallel to said third guide rod, and second spooling means adapted to support a second spooled portion of the film below said fourth guide rod and in an orientation parallel to said fourth guide rod, said first spooling means being biased to rotate the first spooled portion in one direction of rotation, said second spooling means being capable of rotating the second spooled portion in only one direction of rotation so as to prevent movement of film in the second spooled portion toward the first spooled portion.

9. An apparatus in accordance with claim 8 and further comprising film having first and second opposite surfaces, said film being wound around said upper, lower, third, and fourth guide rods and between said first spooling means and said second spooling means such that said lower guide rod contacts said second surface of said film, and said third, fourth and upper guide rods contact said first surface of said film.

10. An apparatus in accordance with claim 1 and further comprising selectively operable means, including a drive motor, for moving said smoothing and laying means between the first and second positions.

11. An apparatus in accordance with claim 1 wherein said smoothing and laying means further comprises a frame, wherein said upper and lower guide rods are rollers that each have opposite ends, wherein said frame supports said opposite ends of each roller, for rotation of each roller relative to said frame, wherein said upper roller has a middle cylindrical portion having a diameter, wherein said upper roller has cylindrical end portions proximate each of said opposite ends of said upper roller, which cylindrical end portions each have a diameter equal to the diameter of said middle cylindrical portion, and wherein said upper roller has reduced diameter portions between said middle portion and said end portions, on either side of said middle portion, said reduced diameter portions having diameters that are each less than the diameter of said middle cylindrical portion.

12. A method in accordance with claim 9 and further including a wiper bar closely spaced from said lower guide rod and adapted to have the film wound between said wiper bar and said lower guide rod, said wiper bar being sufficiently close to said lower guide rod so as to substantially prevent liquid from said tank and on the film from reaching said upper guide rod.

13. An apparatus for producing three dimensional objects by irradiating uncured photopolymeric material to solidify at least portions of the photopolymeric material, said apparatus comprising:

a tank adapted to contain liquid photopolymeric material, the liquid photopolymeric material in said tank defining an upper generally horizontal surface;

selectively operable means for irradiating photopolymeric material in said tank; and laying means including upper and lower parallel spaced apart rollers, said upper roller being parallel to and higher than said lower roller, said upper roller having a middle cylindrical portion having a circumference, said upper roller having cylindrical end portions, which cylindrical end portions each have a circumference, and said upper roller having reduced circumference portions between said middle portion and said end portions, on either side of said middle portion, said reduced circumference portions each having a circumference less than the circumference of said middle cylindrical portion and less than the circumference of said cylindrical end portions, said middle cylindrical portion having a width that is at least as wide as the width of the tank, said laying means being movable between a first position on one side of said tank to a second position on the other side of the tank for laying a sheet of film onto the liquid photopolymeric material while moving from the first position to the second position and with the lower roller adapted to contact a surface of the film which surface faces away from the liquid polymer and to press the film against the liquid photopolymeric material.

14. A method of producing three dimensional objects by irradiating uncured photopolymeric material to solidify at least portions of the photopolymeric material, said method comprising the following steps:

providing an apparatus which includes a tank adapted to contain liquid photopolymeric material, includes a roller means, movable from a first position to a second position, for smoothing a sheet of film material, which film material does not substantially interfere with the transmission of radiation therethrough, onto the liquid polymer, the roller means including upper and lower parallel spaced apart rollers each extending horizontally in respective directions that are each perpendicular to the direction of movement of the roller means between the first position and the second position, the upper roller being located above the lower roller, and, when the roller means is in the first position, the upper roller being located further from the tank than the first roller, and which apparatus includes a selectively operable source of radiation for solidifying the liquid photopolymeric material in said tank;

providing liquid photopolymeric material in the tank, the liquid photopolymeric material defining an upper generally horizontal surface;

causing the roller means to smooth the upper generally horizontal surface of photopolymeric material in the tank while moving from the first position to the second position; and causing the selectively operable source of radiation to operate to supply radiation, through at least a portion of the film, to at least a portion of the liquid photopolymeric material in the tank.

15. A method in accordance with claim 14 and further comprising, after said radiation supplying step, the following steps in order:

lowering the irradiated photopolymeric material in the tank;

adding liquid photopolymeric material to the tank to define an upper generally horizontal surface of liquid photopolymeric material above the irradiated photopolymeric material;

causing the roller means to smooth the film onto the upper generally horizontal surface of photopolymeric material while moving from a first position to a second position; and causing the selectively operable source of radiation to operate to supply radiation, through at least a portion of the film, to a least a portion of the liquid photopolymeric material in the tank.

16. A method in accordance with claim 14 wherein said step of providing a liquid photopolymeric material in the tank comprises the step of filling the tank to define the upper horizontal surface.

17. A method in accordance with claim 16 and further comprising the step of providing additional liquid photopolymeric material at the upper horizontal surface at a side of the tank closest to the first position before said step of causing the roller assembly to smooth.

* * * * *

UNITED STATES PATENT AND TRADEMARK OFFICE
CERTIFICATE OF CORRECTION

PATENT NO. : 5,306,446
DATED : April 26, 1994
INVENTOR(S) : Robert J. Howe

It is certified that error appears in the above-identified patent and that said Letters Patent is hereby corrected as shown below:

Column 10, line 15, delete "A method", and insert ---An apparatus---.

Signed and Sealed this

Sixteenth Day of August, 1994

Attest:

BRUCE LEHMAN

Attesting Officer        Commissioner of Patents and Trademarks